June 29, 1943.     G. E. UNDY     2,322,754
TIMING CONTROL SYSTEM
Filed Jan. 17, 1941
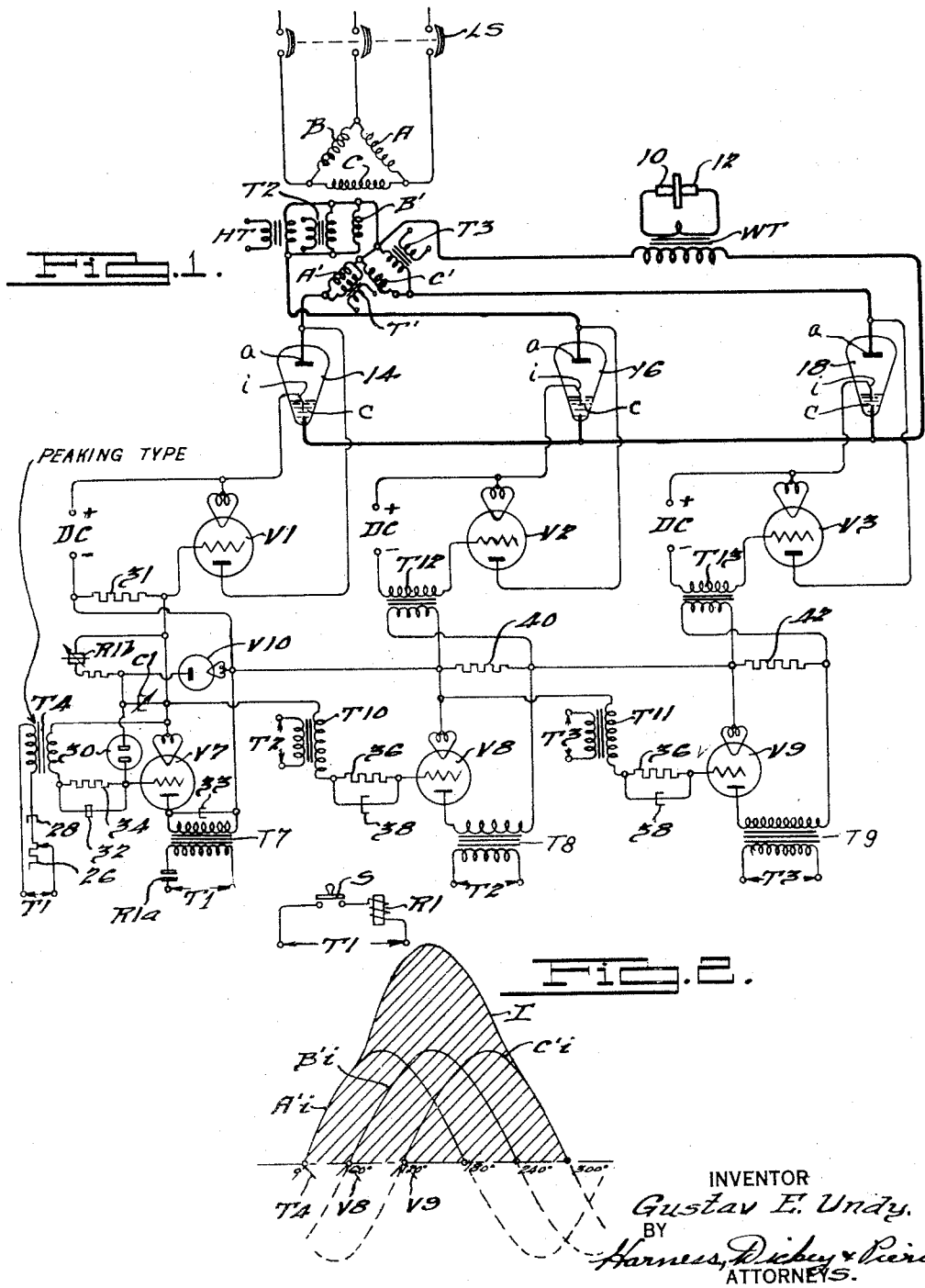

Patented June 29, 1943

2,322,754

UNITED STATES PATENT OFFICE 2,322,754

TIMING CONTROL SYSTEM

Gustav E. Undy, Detroit, Mich., assignor to Weltronic Corporation, Detroit, Mich., a corporation of Michigan Application January 17, 1941, Serial No. 374,951

10 Claims. (Cl. 250—27)

The present invention relates to timing control systems and in particular provides a system for controlling the operation of a single phase welding circuit from a multiphase alternating current source.

The principal objects of the present invention are to provide a system of the above general character, which is simple in arrangement and reliable and efficient in operation; to provide such a system, utilizing rectifying devices interposed between a multiphase source and a single phase welding circuit, in such relation that each impulse of current delivered to the welding circuit is equal to the summation of equal current components drawn from the individual phases of the source, whereby the welding load is equally distributed between the several phases of the source; to provide such a method and apparatus, wherein each successive current impulse delivered to the welding circuit represents the summation of one half-cycle of current flow in each individual phase of the source of supply; to provide such a method and apparatus, utilizing translating means interposed between the rectifiers and the source; to provide such a method and apparatus wherein the rectifying means are of the gaseous discharge type, and wherein the control means associated therewith function to limit each welding impulse to the summation of one half-cycle of each phase of the source.

With the above, as well as other and more detailed objects in view, which appear in the following description and in the appended claims, a preferred but illustrative embodiment of the invention is shown in the accompanying drawing, in which:

Figure 1 is a diagrammatic view of a welding system embodying the invention; and Fig. 2 is a diagrammatic view illustrative of current conditions in the system of Fig. 1.

It will be appreciated from a complete understanding of the present invention that the improvements thereof may, in a generic sense, be utilized for a variety of specific purposes, and that various modifications may be made in the present apparatus, all without departing from the spirit of the invention. In the herein illustrated preferred forms, however, the invention is utilized to control an electric welding system embodying certain of the inventions disclosed and claimed in the copending joint application of Chester F. Leathers and the present applicant, Serial No. 374,952, filed January 17, 1941.

Referring first to Fig. 1, the illustrative welding electrodes 10 and 12 are connected in a local circuit which includes the secondary winding of a usual welding transformer WT. The electrodes 10 and 12 may be variously constructed, depending upon the nature of the welding operation to be performed, and it will be understood that one or both of these electrodes may be retractable so as to enable the removal and insertion of the workpieces. Suitable means may also be provided to bias the electrodes 10 and 12 into engagement with the work.

The primary winding of the welding transformer WT is connected, through a series of three rectifiers 14, 16 and 18, to the respective secondary windings A', B' and C' of a conventional three-phase supply transformer ST, the winding B' being reversely connected. As shown, the secondary windings are star-connected and the primary windings A, B and C are connected in delta. The primary windings derive power from a usual three-phase supply circuit, under control of a usual line switch LS.

The rectifiers 14, 16 and 18 may be variously constructed, but are illustrated as being of the gaseous discharge type, each having an anode $a$, a cathode $c$ and an igniter electrode $i$. The cathodes $c$ are preferably of a reconstructing type, such as mercury, and the igniters are preferably permanently immersed in the corresponding cathodes. Rectifiers of this general type are well known in the art, and it will be understood that these rectifiers are normally non-conducting, but that, upon the application of a critical potential between the igniter and the cathode during a half-cycle in which the anode is positive with respect to the cathode, they become conducting and remain so for the balance of the corresponding half-cycle of current flow.

The hereinafter described control apparatus, associated with the individual rectifiers 14, 16 and 18, is such that each operation of a starting control device causes the rectifiers 14, 16 and 18 to be sequentially rendered conducting for all or a predetermined part of a half-cycle of current flow. The rectifiers are connected, parallel with each other, to one terminal of the primary winding of the welding transformer WT, and the other terminal of this winding is connected to the center point of the secondary winding of the supply transformer. The just-mentioned sequential actuation of the rectifiers 14, 16 and 18 consequently supplies the welding transformer WT with a single impulse of welding current, the instantaneous values of which are equal to the vectorial sums of currents flowing in the individual secondary windings A', B' and C'.

This relation is clearly indicated in Fig. 2, wherein the A'i curve represents currents flowing in the secondary winding A'; curve B'i represents currents flowing in the secondary winding B'; curve C'i represents currents flowing in the secondary winding C'; and curve I represents the current delivered to the welding circuit. By virtue of the reverse connections of phase B', the curves A'i, B'i and C'i are displaced 60 electrical degrees apart.

As aforesaid, the control system is such that upon each actuation of the starting control device, the rectifiers 14, 16 and 18 are sequentially rendered conducting for all or a predetermined portion of one half-cycle of the corresponding phase. The curve I in Fig. 2 represents the resultant values of current flowing in the welding circuit, assuming that each rectifier is rendered conducting at the zero point of the corresponding current curve. A current wave of the form shown in Fig. 2 has been found particularly advantageous in electric welding processes, particularly those processes designed to weld metals of relatively low resistance, such as aluminum and certain of the alloys thereof now used in aircraft production. This is for the reason that the present arrangement enables the delivery through the work of a relatively large quantity of current in a relatively short space of time, the entire impulse of Fig. 2 being delivered in a period equal to 300 electrical degrees. Moreover, the utilization of the present three-phase source enables the current impulse to be derived from balanced components drawn from the individual phases, thus reducing the current values in each phase and also entirely overcoming the unbalance which is produced on three-phase lines by the operation of single phase welding systems.

The present system employs a series of three firing valves V1, V2 and V3, which are individual, respectively, to the rectifiers 14, 16 and 18, and the plate circuits whereof are connected to the corresponding rectifiers 14, 16 and 18 in the usual manner. The valves V1, V2 and V3 are preferably of the three-element gas filled type, and as will be understood, they are normally non-conducting, but may be rendered conducting, during half-cycles in which the anodes are positive with respect to the cathodes, by applying a critical potential between the grids and the cathodes thereof.

The valves V1, V2 and V3 are rendered normally non-conducting by applying a negative bias to the grids thereof by suitable full-wave rectifying means indicated by the reference characters "DC," and which may be of the type specifically shown in said joint application. In order to fire the respective valves V1, V2 and V3, the just-mentioned negative grid biases are overcome by respectively placing the associated phase control valves V7, V8 and V9 in a conducting condition.

The valves V7, V8 and V9 are provided with grid control apparatus comprising the transformers T4, T10 and T11, which are so controlled that conducting potentials are applied to the grids of these valves at desired critical points in the appropriate half-cycles, and more than one firing action of each valve is prevented by condenser C1, associated with valve V7, as hereinafter described.

The arrangement for controlling the aforesaid sequential operation of the valves embodies the inventions disclosed and claimed in Collom Patent No. 2,289,321, granted July 7, 1942, and in applicant's copending application Serial No. 402,922, filed July 18, 1941. The arrangement for limiting the firing actions of the valves, as aforesaid, embodies the invention claimed in applicant's copending application Serial No. 450,483, filed July 10, 1942.

It is thought that the remaining details of the present system may best be understood from a description of the operation of the system as a whole.

Assuming it is desired to effect a welding operation, the system may be conditioned for operation by closing the main switch LS, which energizes the primary windings of the supply transformer ST, which thereupon energizes a series of control transformers T1, T2 and T3, and a filament transformer HT, the secondary winding whereof thereupon becomes effective to apply heating currents to the filaments of the previously mentioned valves V1, V2, V3, V7, V8 and V9, as well as to the filament of the auxiliary rectifier V10. This latter action may also, as will be appreciated, actuate the biasing means DC so as to apply negative biases to the grids of the firing valves V1, V2 and V3, thereby rendering these latter valves non-conducting.

Transformers T1, T2 and T3 are associated, respectively, with the phases A', B' and C', and supply energy for operating the control elements associated, respectively, with the corresponding rectifiers 14, 16 and 18. Grid transformers T4, T10 and T11, associated, respectively, with the phase control valves V7, V8 and V9, are directly connected to transformers T1, T2 and T3, respectively, and remain energized so long as the latter are energized. Plate transformers T7, T8 and T9 also are responsive, respectively, to the control transformers T1, T2 and T3, the primary circuit for transformer T7 being subject to control by the relay R1. These connections are indicated by the reference characters applied to the terminals of transformers T4 and T7 through T11.

Transformers T10 and T11 apply negative biases to the grids of valves V8 and V9, which biases are overcome, as described below, as a consequence of the firing of valve V7.

As will be appreciated, transformer T4 is effective during each alternate half-cycle of the voltage across phase A' to apply a positive or conducting potential to the grid of the valve V7, and the connections for transformer T7 are such that the latter, if energized, renders the anode of valve V7 positive with respect to the cathode thereof during the same half-cycle. The application of the conducting potential to the grid of valve V7 is, however, without effect unless the associated control relay R1 has previously been operated, as hereinafter described, to initiate a welding operation. Transformer T4 is preferably of the peaking type, so that the voltage thereof is sufficiently high to apply the necessary potential to the grid of valve V7 only during a relatively small fraction of the appropriate half-cycle, and in addition, transformer T4 is provided with conventional adjustable phase shifting elements 26 and 28. The former may be adjusted to enable transformer T4 to apply the afore-mentioned conducting potential to the grid of valve V7 at any desired point along the voltage curve of phase A'. In producing the current form shown by the shaded area in Fig. 2, it will be appreciated that this adjustment is such that valve V7 is rendered conducting at the hypothetical zero point of the current wave in the corresponding secondary phase A'.

With the system thus prepared for operation, and assuming that the work has been properly clamped between the electrodes 10 and 12, a welding operation may be initiated by closing the control device S, herein illustrated as a manually operable push button. Closure of the button S completes obvious energizing circuits for the windings of the usual electromagnetic relay R1, which thereupon closes its contact member a and opens its contact member b. The opening of contact member b of the relay R1 has no immediate effect except to open a normally complete discharge circuit for the previously mentioned condenser C1. Closure of the relay contact R1a completes an obvious energizing circuit for the primary winding of the plate transformer T7. When, after the closure of switch S, transformer T4 develops its critical potential, and thereby renders valve V7 conducting, transformer T7 is enabled to pass current through the valve V7 and build up a potential across the resistor 31 which overcomes the normal negative bias on the grid of the valve V1. In response to this action, valve V1 becomes conducting, and thereby enables the secondary phase A' to apply a firing potential between the igniter electrode i and the cathode c of the rectifier 14. In response to this action, which occurs, with the preferred adjustment, at the zero point of the curve A'i (Fig. 2), rectifier 14 is rendered conducting and a current flow is initiated through winding A' of the supply transformer ST, rectifier 14 and the primary winding of the welding transformer WT.

The passage of current through the valve V7 charges the condenser C1, enabling the latter to break down the discharge tube 30 and apply a blocking potential to the grid of valve V7. This action does not alter the current flowing through valve V7 during the half-cycle in question, but it does prevent this valve from being rendered conducting during the next half-cycle of similar polarity, even though the button S is maintained closed.

As will be evident, the grid and cathode of valve V8 are connected, through the blocking transformer T10, to the plate circuit of valve V7, and are consequently in parallel with the resistor 31. The potential across resistor 31 opposes the potential of transformer T10. Consequently, the potential built up across the resistor 31, upon actuation of valve V7, overcomes the bias of transformer T10 and applies a conducting potential to the grid of valve V8. This action occurs, with respect to the actuation of valve V7, after a time displacement determined by the relative values of opposing potentials in the circuit for the grid of valve V8. Preferably, the adjustment is such that valve V8 is rendered conducting 60 electrical degrees after the actuation of valve V7.

The actuation of valve V8 enables the transformer T8 to energize the grid transformer T12, associated with valve V2, in such relation as to overcome the normal negative grid bias on this valve and render the latter conducting. This action, as will be understood, fires the rectifier 16.

The actuation of valve V8 also enables transformer T8 to build up a potential across resistor 40, which opposes the bias of transformer T11 and which overcomes the negative bias normally applied to the grid of valve V9 by transformer T11 in substantially the same manner as described in connection with the actuation of valve V8. Consequently, at an accurately determinable time after the actuation of valve V8, preferably 60 electrical degrees, valve V9 is rendered conducting, thereby enabling transformer T9 to energize transformer T13. The latter action fires valve V3 which, in turn, fires the associated main rectifier 18.

As aforesaid, valve V7 remains conducting only during the balance of the corresponding half-cycle, and so is enabled to deliver only one actuating impulse to valve V8. Similarly, after having been rendered conducting, valve V8 remains so only throughout the balance of the corresponding half-cycle and thus is enabled to supply only one actuating impulse to valve V9. The closure of the starting button S consequently causes only a single firing action of the series of rectifiers 14, 16 and 18.

In addition to determining the firing point of valve V9, resistor 40 acts to suppress any surges from transformer T12 when the latter is deenergized, and resistor 42 acts similarly in relation to transformer T13.

The bottom S may be released at any time after the termination of the welding impulse and such action re-opens the relay contacts R1a, thereby deenergizing the transformer T7 and also recloses the contacts R1b. The latter action completes the discharge circuit for the condenser C1, thereby conditioning the system for a subsequent operation, which may be initiated, as before, by reclosing the starting button S.

It will be recognized that, if desired, the phase shifting elements associated with the transformers T4, T10 and T11 may be adjusted, either individually or together, so as to delay the firing points of the several main rectifiers 14, 16 and 18, thereby limiting the firing time of these rectifiers to a desired fraction of the full half-cycle described above, and correspondingly reducing the quantity of current delivered to the welding circuit during each complete welding cycle.

It will be appreciated that various changes in the invention, as herein specifically disclosed, may be made without departing from the spirit and scope of the invention.

What is claimed is:

1. In a timing control system for a plurality of translating means, valve means individual to each of said translating means, control means for actuating one of said valve means so as to effect an operation of the corresponding translating means, means operated as a consequence of the actuation of said one valve means for actuating another of said valve means, said last mentioned means being operably independent of the operation of the translating means corresponding to said one valve means, means rendered effective by the actuation of said valve means for preventing, until reset, a subsequent actuation thereof, and means controlled by said control means for controlling said resetting.

2. In a timing control system for a plurality of electric discharge devices each having principal electrodes and a control element, a plurality of valves individual respectively to said devices, means operated when said valves are rendered conducting for applying an operating potential between the corresponding control element and one of the corresponding principal electrodes, control means for operating one of said valves so as to render it conducting, means operated as a consequence of the operation of said one valve for rendering another of said valves conducting, said last mentioned means being operably independent of the operation of the said device corresponding to said one valve, means rendered effective by the operation of said valves for preventing, until reset, a subsequent operation thereof, and means controlled by said control means for controlling said resetting.

3. In a timing control system for a plurality of electric discharge devices each having principal electrodes and a control element, a plurality of valves individual respectively to said devices, means operated when said valves are rendered conducting for applying an operating potential between the corresponding control element and one of the corresponding principal electrodes, control means for operating one of said valves so as to render it conducting, means operated as a consequence of the operation of said one valve for rendering another of said valves conducting, said last mentioned means being operably independent of the operation of the said device corresponding to said one valve, means responsive to current flow through said one valve for preventing, until reset, a re-operation of said one valve, and means controlled by said control means for controlling said resetting.

4. In a timing control system for a plurality of electric discharge devices each having principal electrodes and a control element, a plurality of valves individual respectively to said devices, means operated when said valves are rendered conducting for applying an operating potential between the corresponding control element and one of the corresponding principal electrodes, a control member movable between first and second positions, means responsive to movement of said control member to said first position for rendering one of said valves conducting, means responsive to the conducting condition of said one valve for rendering another of said valves conducting, said last mentioned means being operably independent of the operation of the said device corresponding to said one valve, and blocking means the effect of which is released when said control member is moved to said second position, said blocking means preventing the re-operation of said one valve until so released and being operably responsive to current flow through said one valve.

5. In a control system for association with a multiphase source of periodically pulsating currents, which said phases are displaced relative to each other as to time, the combination of a plurality of normally non-conductive electric valves corresponding respectively to said phases and each having a pair of principal electrodes coupled to the corresponding phase in such relation as to control the flow of current therein, control means for altering the conductive condition of one of said valves so as to render the same conductive, and means operably responsive to said alteration for altering the conductive condition of another of said valves.

6. In a control system for association with a multiphase source of periodically pulsating currents, which said phases are displaced relative to each other as to time, the combination of a plurality of electric valves corresponding respectively to said phases and each having a pair of principal electrodes coupled to the corresponding phase in such relation as to control the flow of current therein, control means operable at random relative to the periodicity of said source, and means responsive to each operation of said control means for successively altering, in predetermined order, the conductive conditions of said valves.

7. In a control system for association with a multiphase source of periodically pulsating currents, the several phases whereof are displaced relative to each other as to time, the combination of a translating means individual to each of said phases, a normally non-conductive electric valve means individual to each said translating means and having a pair of principal electrodes coupled to said translating means in such relation as to control the flow of current therethrough, control means for altering the conductive condition of one of said valves so as to render the same conductive, and additional means responsive to said alteration for altering the conductive condition of another of said valves.

8. In a control system for association with a multiphase source of periodically pulsating currents, the several phases whereof are displaced relative to each other as to time, the combination of a translating means individual to each of said phases, an electric valve means individual to each said translating means and having a pair of principal electrodes coupled to said translating means in such relation as to control the flow of current therethrough, control means operable at random relative to the periodicity of said source, and means responsive to each operation of said control means for successively altering, in predetermined order, the conductive conditions of said valves.

9. In a control system for association with a multiphase source of periodically pulsating currents, the several phases whereof are displaced relative to each other as to time, the combination of a translating means individual to each of said phases, an electric valve means individual to each said translating means and having a pair of principal electrodes coupled to said translating means in such relation as to control the flow of current therethrough, control means operable at random relative to the periodicity of said source, and means responsive to each operation of said control means for successively altering, in predetermined order, the conductive conditions of said valves, said successive alterations in conductivity being displaced from each other as to time to correspond to the time displacement between said phases.

10. In a control system for association with a multiphase source of periodically pulsating currents, which said phases are displaced relative to each other as to time, the combination of an electric valve means individual to each of said phases, each said valve means having a pair of principal electrodes coupled to the corresponding phase in such relation as to control the flow of current therein and each said valve means also having a control electrode for controlling the conductivity of the corresponding valve, control means operably associated with the control electrode of one said valves for altering the conductivity thereof at a predetermined time relative to the periodicity of the corresponding phase, means coupling the principal electrodes of said one valve to the control electrode of another of said valves whereby said alteration alters the conductivity of said other valve at a corresponding time relative to the periodicity of the phase corresponding to said other valve, and an initiating means operable at random relative to the periodicity of said source for actuating said control means to thereby successively alter the conductivity of said one valve and thereafter alter the conductivity of the other valve.

GUSTAV E. UNDY.